United States Patent [19]

Antunez

[11] Patent Number: 4,730,639

[45] Date of Patent: Mar. 15, 1988

[54] TANK VALVE WITH SHUTTER TYPE DIVERTER

[76] Inventor: Bruce A. Antunez, 1143 Indian Springs Dr., Glendora, Calif. 91740

[21] Appl. No.: 912,579

[22] Filed: Sep. 26, 1986

[51] Int. Cl.[4] .................. F16K 31/26; F16K 47/08
[52] U.S. Cl. .......................... 137/413; 4/366; 137/312; 137/430; 137/437; 137/441; 137/444; 138/46; 251/121
[58] Field of Search ............... 137/413, 414, 429, 430, 137/436, 437, 441, 444, 312; 4/366; 251/120, 121; 138/45, 46

[56] References Cited

U.S. PATENT DOCUMENTS

| | | | |
|---|---|---|---|
| 1,391,860 | 9/1921 | Sherwood | 137/441 |
| 1,525,334 | 2/1925 | Stengel | 137/436 |
| 1,787,601 | 1/1931 | Swanberg | 137/441 |
| 2,195,797 | 4/1940 | Groeniger | 137/441 |
| 2,409,890 | 10/1946 | Owens | 137/437 |
| 2,791,235 | 5/1957 | Smith | 137/437 |
| 3,516,094 | 6/1970 | Reagan | 137/436 |
| 3,618,629 | 11/1971 | Heyer et al. | 137/413 |
| 3,729,017 | 4/1973 | Brandelli | 137/414 |
| 3,930,516 | 1/1976 | Flinner et al. | 137/436 |
| 4,420,845 | 12/1983 | Antunez | 137/437 |

Primary Examiner—George L. Walton
Attorney, Agent, or Firm—Donald D. Mon

[57] ABSTRACT

A two function tank valve according to this invention includes a vertically oriented supply tube or conduit with an upper opening. A valve seat surrounds the opening, and a valve seal is movable against it and away from it. Water level responsive means determines this valve setting so the valve can be opened to fill the tank, and can be closed when the tank is full.

4 Claims, 4 Drawing Figures

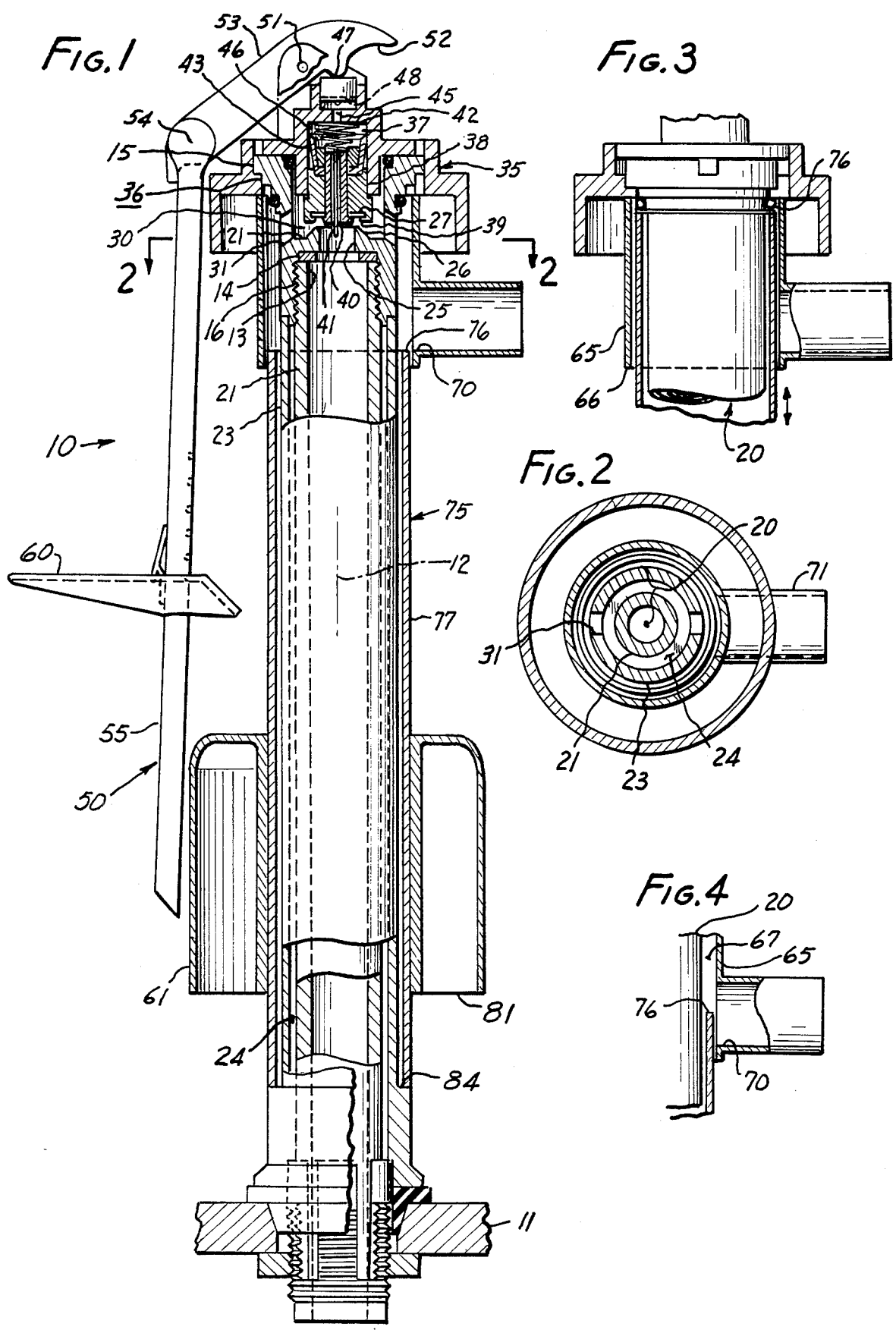

TANK VALVE WITH SHUTTER TYPE DIVERTER

FIELD OF THE INVENTION

This invention relates to a tank valve to supply a water tank, and at certain times in a flushing cycle, also to supply water to another place such as the rim of a toilet bowl.

BACKGROUND OF THE INVENTION

This invention relates to a tank valve. Tank valves are responsive to water levels in a tank. The water is released from the tank to the toilet bowl by opening a flush valve. The tank valve opens to resupply the tank after the water level falls below some predetermined level, and continues to be open to flow until the water level is restored. During this cycle, the flush valve will have closed to enable the tank to be refilled.

The bowl itself has a siphon construction, and empties when sufficient water has been dumped from the tank to raise the level of water in the bowl high enough to start the siphoning action. Discharge from the bowl continues until the siphoning action concludes by having drawn the level below a bend which otherwise excludes air from the siphon. The discharge includes water that continues to arrive from the tank for a time after the siphoning begins, but finally a lower level is reached and the siphoning stops. The bowl will then have been emptied. Now it is necessary to supply the bowl with enough water to make a gas seal, and receive the next load, but not enough to restart the siphoning. This additional water is supplied through a separate line, called a fill line, which discharges through the tank overflow pipe into the bowl. While the refill line flows at all times when the tank valve is open to flow, the bowl refill operation basically takes place after the flush valve has closed and the tank is also being refilled. Because relatively little water is needed for the bowl, compared to the amount needed to refill the tank, the refill line generally delivers only a trickle.

The above system works well when there is a tank with a substantial reserve volume and a substantial pressure head. However, there is a class of toilet called the "low-boy" in which only a small tank is provided, and it is not much higher than the bowl itself. This tank is unobtrusive in the bathroom, and is favored by many designers. The older system does not provide a tank with a sufficient quantity of water per flush, nor a sufficient water pressure to make an effective flush in such an environment. For this reason, a variation on this system has been developed in which a much larger proportion of the water for the flush is supplied from the tank valve during the flushing operation. The tank valve then provides water for storage, water under pressure to assist in the flush, and water to refill the bowl. During the time the tank is discharging, the tank valve is also discharging to the bowl rather than only to the tank. This provides for an effective rinse of the bowl wall, and for a major supplement to the water for the discharge of the bowl.

An additional further function required of the tank valve for this purpose is that during the tank discharge, a substantial portion of the tank valve flow is diverted to the bowl, instead of primarily only to the tank to refill the tank.

The manufacture of tank valves is highly competitive. It is a large volume operation, and lower costs translate very quickly into better sales. Still, these valves must be among the most trustworthy items in the home or office building, because their failure can lead to considerable and very expensive water damage. Thus, economy cannot be purchased by lessening the quality or reliability of the valve. The efforts must be toward innovative valves which are inherently less expensive to make, and which are equally reliable and functional, or more so. This invention is such a product.

Prior tank valves capable of providing the described secondary diversion function have tended toward the use of secondary float responsive valves which have been an additional substantial cost or have been more complicated than need be, or they have discharged constantly through both paths. It is an object of this invention to provide a two-function tank valve that can provide the desired diversion while utilizing basic tank valve elements whose economy of manufacturing and reliability are already well-established, and with the use of elegantly simple and inexpensive additional structure. An example of a prior arrangement is shown in Antunez U.S. Pat. No. 4,420,845, issued Dec. 20, 1983.

BRIEF DESCRIPTION OF THE INVENTION

A two function tank valve according to this invention includes a vertically oriented supply tube with an upper opening. A valve seat surrounds the opening, and a valve seal is moveable against it and away from it. Water level responsive means determines this valve setting so the valve can be opened to fill the tank, and can be closed when the tank is full.

A discharge tube receives water from the supply tube when the valve is open. It surrounds the outer wall of the discharge tube near its upper end and discharges downwardly. A diversion port opens into a spacing between the discharge tube and the supply tube.

Shutter means is axially slidable in the spacing so as variably to occlude the diversion port in response to the position of float means responsive to water level in the tank.

According to a preferred but optional feature of this invention, the discharge tube and shutter means are concentric with the supply tube, and the float means is attached to the shutter means.

The above and other features of this invention will be fully understood from the following detailed description and the accompanying drawings, in which:

BRIEF DESCRIPTION OF THE DRAWINGS

FIG. 1 is an axial cross-section of the presently preferred embodiment of the invention;

FIG. 2 is a cross-section taken at line 2—2 in FIG. 1;

FIG. 3 is a vignette showing a portion of FIG. 1 in another operative position: and FIG. 4 is a vignette showing this portion in an intermediate position.

DETAILED DESCRIPTION OF THE INVENTION

Tank valve 10 according to the invention is shown is FIG. 1 mounted to the bottom of a tank 11. The valve has a central axis 12 which is vertical in its usual orientation. The tank has an opening 13 in its bottom in which the valve is sealingly fitted. For this purpose there is provided a washer 14 and a nut 15 which surround a thread 16 on the supply tube 20 of the valve. The threads are interrupted by a plurality of axially extending grooves 21. The supply tube or supply conduit is comprised of an internal pipe 22 and a surrounding concentric shield pipe 23. A dry annular spacing 24 is formed between these which is communicated through the grooves to the outside of the tank. It will therefore be seen that a failure of internal pipe 22 will result in a flow of water through the grooves, and the failure of the shield pipe will result in a similar flow. The objective is to protect the water supply even at the expense of the environment in which the tank is installed.

This is a conventional construction, and pipes 22 and 23 are together defined as forming supply tube 20. The supply tube has an outlet port 25 surrounded by a valve seat 26. This upper end of the supply tube is formed of several parts for ease in construction, the seat itself having been formed on a seat member 27 threaded to the internal pipe with a washer 28 between them. Seat member 27 extends vertically above the valve seat to provide a valve chamber 30 with passages 31 leading radially therefrom.

A cap member 35 has a bayonet coupling 36 for attachment for matching portions on the seat member to hold them together. Such an arrangement is shown in Antunez U.S. Pat. No. 3,389,887, issued June 25, 1968 to which reference maybe had for further details.

A valve cylinder 37 is formed in the cap member coaxially along axis 12. It houses a valve piston 38 with a valve seal 39 facing the valve seat. The valve piston is moveable axially so that the valve seal can be moved against and can be moved away from the valve seat to close or to open the valve to flow as appropriate. While a piston can readily be provided to be physically pushed against the valve seat, it is frequently desirable to have it moveable as the consequence of differential pressure exerted across it, as shown. For this purpose a bleed passage 40 extends from end to end of the piston and has within it a cleaning pin 41 of lesser radial dimensions such that as it rattles around it keeps the bleed passage clean. It still passes fluid so that a differential pressure can be exerted across the valve piston. A bias spring 42 gently biases the valve piston toward the valves seat. A chevron seal 43 makes a sliding seal within the valve piston.

A bleed port 45 extends between the bleed chamber 46 above the valve piston to atmosphere past a plug 47 which is adapted when pressed down to close port 45 and which when raised permits flow through slots 48.

Level responsive linkage 50 includes a pivot 51, a finger 52, an arm 53, a knuckle 54 and a shaft 55. When shaft 55 is raised its effect is to press the knuckle down and close the bleed port. The result of this is to close the valve. When the position occurs that is shown in FIG. 1, which relates to a low water level condition, the valve is open to flow. The shaft has fallen and the bleed passage is open to atmosphere such that the differential pressure across the piston derived from system pressure has shifted the piston and the valve is opened. A restraint 60 is movably attached to the shaft to determine the elevation at which it will be abutted by a float 61 as will later be described.

Returning now to the internal valve construction, a discharge tube 65 is fixed to the valve at its upper end and concentric with the supply tube. It is closed at its upper end and opened at its lower end 66. A discharge spacing 67 is formed between the discharge tube and outer wall of the supply tube and discharge from passages 31 will be outwardly into that spacing and downwardly around the entire annular spacing. A diverter port 70 is formed through the wall of the discharge tube and includes a conduit 71 connectable to a hose or to whatever conduitry is provided to take water from the diverter port to a secondary location such as the rim of a flush toilet. Water escaping past the lower end 66 flows directly into the storage tank to refill it.

A shutter 75 comprises a cylindrical tube having a wall thickness less than the spacing at the lower end 66, so that the water can flow past it downwardly. It may but usually will not form a close fit with the inside diameter of the discharge tube. Its purpose is selectively to occlude a portion of the diverter port as desired. It has an upper end 76 which when disposed as it is in FIG. 1 permits maximum flow through diverter port 70. FIG. 4 shows an intermediate position where lesser flow is permitted, although there is no interference with flow downwardly past the lower end. In FIG. 3 the diverter port is shown substantially closed.

The function of this invention is to determine the diversion through the diverter port as a function of water level in the tank.

For this purpose, float 61 is fitted to the outside of the shutter tube 77. It may be held there with a good frictional fit and may be ribbed such as to permit flow past much of its internal area if desired. Otherwise downwardly directed water merely washes over it. It has an open lower end 81 which provides an air chamber 82 that will trap air when the water rises and will permit the escape of any entrapped water when the level falls sufficiently. The restraint 60 overhangs the upper shoulder 83 so that as the float rises sufficiently it will lift the shaft and close the valve. The water level can be adjusted by suitably moving the restraint and the float along the shaft and the shutter tube respectively as will be obvious from the drawings.

It will be understood that the shutter tube need not be fully tubular and that its upper end need not be fully circular. What is important is that as the water level rises and falls the upper end 76 will selectively occlude the diverter port within the limits of the device. It will also be noted that there are times when the diverter tube will be fully raised as shown in FIG. 3 or may even "hang up" by its lower end resting on a ledge 84 on the supply tube. It may be slotted at its lower end to facilitate discharge of water from it. These are all features which make for a forgiving product.

The operation of the device should be evident from the foregoing. After the restraint and the float are adjusted to provide for full closure after the desired water level is obtained, then the device is ready for operation. A flush valve (not shown) is provided to trap and to release water from the tank. When it is opened, the float will fall and the diverter port and the valve will be open to flow. Accordingly water will flow both into the tank and through the diverter port. After the flush valve has closed, the situation will continue until the water level rises to the extent that the upper edge of the shutter begins to occlude and finally fully occludes the diverter port, after which the flow will be entirely to the tank until ultimately the float is lifted to the predetermined level and the tank valve will be closed, because the tank is full as desired.

This device is inexpensive and desirable. All of the parts except for the shutter are shown in various well known devices, for example Heyer U.S. Pat. No. 3,618,629, issued Nov. 9, 1971. What this device does is to enable the use of a shutter and preferably a tubular shutter tube to provide an elegantly simple means to determine the direction of flow for two functions in a tank valve under certain conditions of cycle operation.

This invention is not to be limited by the embodiment shown in the drawings and described in the description which is given by way of example and not of limitation, but only in accordance with the appended claims.

I claim:

1. A two-function tank valve for both refilling a water storage tank and for providing a stream of water for another purpose during a drain and refill cycle for the tank, said valve comprising:

a supply conduit adapted to be mounted to the tank and having an outer wall which is substantially vertically oriented when the valve is installed in said tank, said supply conduit having an outlet port;

valving means mounted to said supply conduit comprising a valve seat surrounding said outlet port and a valve seal movable against said valve seat to close the outlet port and to move away from it to open said outlet port to flow;

a discharge tube mounted to said supply conduit and surrounding said outer wall at an upper region thereof, said discharge tube being closed at its top and open at its bottom, leaving a spacing between said supply conduit and itself receptive of water passed by said valving means, and discharging water downwardly through said spacing;

a diversion port opening into said spacing through said discharge tube, adapted to be connected to conduitry for said another purpose;

shutter means adapted to slide axially along the outer wall of said supply conduit to occlude varying proportions of said diversion port, at least a portion of said shutter means being disposed in said spacing and axially movable therein for controlling the stream of water to said diversion port;

float means responsive to water level changes in the tank and connected to said shutter means adjustably to vary said occlusion of said diversion port by said axial movement, which is a function of the water level within the tank, at least within an upper range of water levels; and water level responsive means for causing said valving means to open to flow when the water level in the tank is below a pre-selected upper level, and to close to flow when the water level is at or above said pre-selected upper level.

2. A tank valve according to claim 1 in which the supply conduit and discharge tube are coaxial, with water level responsive means, comprises a linkage operably connected to said float means and adapted to cause said valving means to open when the water level is below a predetermined level and to close when it is at or above a predetermined level.

3. A tank valve according to claim 2 in which said shutter means is a tube coaxial with said supply conduit and discharge tube, adapted to slide axially between them with a discharge spacing remaining, said shutter means having an area so disposed and arranged as variably to occlude said diverter part as a function of the position of said shutter means along at least a portion of its range of axial movement.

4. A tank valve according to claim 1 in which said valving means is actuated by a differential pressure.

* * * * *